United States Patent
Yang (10) Patent No.: US 12,495,321 B2
(45) Date of Patent: Dec. 9, 2025

(54) CELL MEASUREMENT PROCESSING METHOD AND DEVICE

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 407 days.

(21) Appl. No.: 18/013,895

(22) PCT Filed: Aug. 6, 2020

(86) PCT No.: PCT/CN2020/107492
§ 371 (c)(1),
(2) Date: Dec. 29, 2022

(87) PCT Pub. No.: WO2022/027473
PCT Pub. Date: Feb. 10, 2022

(65) Prior Publication Data
US 2023/0292155 A1    Sep. 14, 2023

(51) Int. Cl.
*H04W 24/08* (2009.01)

(52) U.S. Cl.
CPC .................. *H04W 24/08* (2013.01)

(58) Field of Classification Search
CPC ..... H04W 24/08; H04W 4/025; H04W 4/021; H04W 24/10; H04W 36/0085; H04W 36/14; H04W 36/322; H04W 48/16; H04W 48/18; H04W 48/08; H04W 52/0229; H04W 84/06; H04W 24/02; H04W 52/0212; Y02D 30/70
See application file for complete search history.

(56) References Cited

U.S. PATENT DOCUMENTS

| | | | |
|---|---|---|---|
| 9,094,881 B2 | 7/2015 | Jung et al. | |
| 9,713,048 B2 | 7/2017 | Jung et al. | |
| 2011/0263250 A1* | 10/2011 | Mueck ................. | H04W 48/10 455/434 |
| 2012/0263145 A1* | 10/2012 | Marinier ............. | H04W 64/003 370/331 |

(Continued)

FOREIGN PATENT DOCUMENTS

| | | |
|---|---|---|
| CN | 101547468 A | 9/2009 |
| CN | 101610446 A * | 12/2009 |

(Continued)

OTHER PUBLICATIONS

LG Electronics Inc: "Report on email discussion [106#74][NTN] Cell Selection & reselection", 3GPP Draft; R2-1911297, 3rd Generation Partnership Project (3GPP), vol. RAN WG2, No. Prague, Czech Republic; (Aug. 16, 2019) (Year: 2019).*

(Continued)

*Primary Examiner* — Yuwen Pan
*Assistant Examiner* — Swati Jain
(74) *Attorney, Agent, or Firm* — Arch & Lake LLP; Hao Tan; Shen Wang (57) ABSTRACT

A cell measurement processing method, applied to a base station, includes sending a measurement policy parameter to a user equipment (UE). The measurement policy parameter is configured to indicate a measurement parameter of at least one target frequency of the UE in a target region.

17 Claims, 5 Drawing Sheets

(56) References Cited

U.S. PATENT DOCUMENTS

| | | | | |
|---|---|---|---|---|
| 2014/0220982 A1* | 8/2014 | Jung | ................ | H04W 36/0088 |
| | | | | 455/437 |
| 2014/0228030 A1* | 8/2014 | Jung | ................ | H04W 24/08 |
| | | | | 455/436 |
| 2019/0089841 A1* | 3/2019 | Jeong | ................ | H04W 48/18 |
| 2021/0204158 A1* | 7/2021 | Kimba Dit Adamou | ................ | |
| | | | | H04L 1/0026 |
| 2022/0086671 A1* | 3/2022 | Hong | ................ | H04W 16/28 |
| 2022/0217561 A1* | 7/2022 | Geng | ................ | H04W 64/003 |

FOREIGN PATENT DOCUMENTS

| | | |
|---|---|---|
| CN | 102123435 A | 7/2011 |
| EP | 4024903 A1 | 7/2022 |
| WO | 2013051834 A1 | 4/2013 |
| WO | 2020057418 A1 | 3/2020 |
| WO | 2020145559 A1 | 7/2020 |

OTHER PUBLICATIONS

LG Electronics Inc: "Report on email discussion [106#74] Cell Selection & reselection," 3GPP TSG-RAN WG2 Meeting #107, R2-1911297, Prague, Czech Republic, Aug. 26-30, 2019, (16p). (Year: 2019).*

INOA issued in Application No. 202347008742 dated on Oct. 27, 2023 with partial English translation, (7p).

International Search Report of PCT/CN2020/107492 dated Apr. 26, 2021, with English translation, (4p).

Supplementary European Search Report issued in Application No. 20948002.9, dated Mar. 19, 2024, (11p).

LG Electronics Inc: "Report on email discussion [106#74] Cell Selection & reselection," 3GPP TSG-RAN WG2 Meeting #107, R2-1911297, Prague, Czech Republic, Aug. 26-30, 2019, (16p).

* cited by examiner

CELL MEASUREMENT PROCESSING METHOD AND DEVICE

CROSS-REFERENCE TO RELATED APPLICATION

The present application is a U.S. National Stage of International Application No. PCT/CN2020/107492, filed on Aug. 6, 2020, the contents of all of which are incorporated herein by reference in their entireties for all purposes.

BACKGROUND

In the related art, a network may be divided into a non-territorial network (NTN) and a territorial network (TN). In the NTN, a base station antenna may be located on a high-altitude platform or a satellite, on a high altitude or in space which is tens of kilometers to tens of thousands of kilometers from the ground. Each NTN cell may cover a large range, ranging from tens of kilometers to hundreds of kilometers in diameter depending on the height of the transmitting antenna. The NTN is mainly configured to cover a region without the territorial network, such as oceans and deserts. Since the NTN has a large delay, it is desirable that a user equipment (UE) may try to select the TN as a service cell when the TN exists.

SUMMARY

The present disclosure relates to but is not limited to a field of wireless communication, and more particularly, to a cell measurement processing method and a cell measurement processing device.

According to a first aspect of the embodiments of the present disclosure, a cell measurement processing method is provided, which is applied to a base station. The method includes: sending a measurement policy parameter to a user equipment (UE), the measurement policy parameter being configured to indicate a measurement parameter of at least one target frequency of the UE in a target region.

According to a second aspect of the embodiments of the present disclosure, a cell measurement processing method is provided, which is applied to a user equipment (UE). The method includes: receiving a measurement policy parameter, the measurement policy parameter being configured to indicate a measurement parameter of at least one target frequency of the UE in a target region.

According to a third aspect of the embodiments of the present disclosure, a cell measurement processing device is provided, which is applied to a base station. The device includes: a processor; and a memory configured to store an instruction executable by the processor. The processor is configured to implement following steps: sending a measurement policy parameter to a user equipment (UE), the measurement policy parameter being configured to indicate a measurement parameter of at least one target frequency of the UE in a target region.

It should be understood that the foregoing general description and the following detailed description are merely illustrative and explanatory and may not be construed to limit the present disclosure.

DETAILED DESCRIPTION

Illustrative embodiments will be described in detail, and examples of the embodiments are shown in the drawings. When the following description relates to accompanying drawings, same numbers in different accompanying drawings represent same or similar elements, unless otherwise indicated. The implementations described in the following illustrative embodiments do not represent all the implementations consistent with the present disclosure. Instead, they are only examples of devices and methods consistent with some aspects of the present disclosure as detailed in the appended claims.

Terms used in the present disclosure are only for the purpose of describing specific embodiments, and are not intended to limit the present disclosure. As used in the embodiments of the present disclosure and the appended claims, "a/an," "said" and "the" in singular forms are also intended to include plural forms, unless otherwise clearly indicated in the context. It should also be understood that the term "and/or" used herein represents and includes any and all possible combinations of one or more associated listed items.

It should be understood that although terms such as "first," "second," and "third" may be configured to describe various kinds of information in the present disclosure, such information shall not be limited by these terms. These terms are only configured to distinguish information of the same type from each other. For example, without departing from the scope of the present disclosure, the first information may also be referred to as the second information, and similarly, the second information may also be referred to as the first information. Depending on the context, the term "if" used here may be interpreted as "when" or "upon" or "in response to determining."

A network may configure a priority for each frequency. When a user equipment (UE) is in an idle or inactive state, the frequency is measured according to the priority. In order to enable the UE to preferentially select a territorial network (TN) as a service cell, the frequency where the TN is located is usually set to a high priority. However, due to the large coverage of a non-territorial network (NTN) cell, the UE may always measure the frequency with a high priority, thus resulting in unnecessary power consumption.

Figure 1:
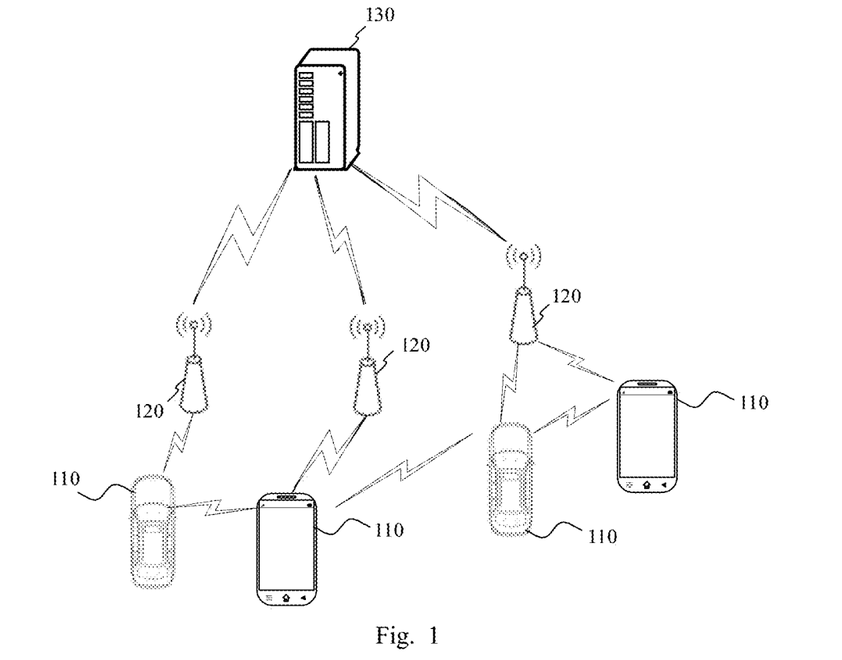
FIG. 1 is a schematic view of a wireless communication system.

Referring to FIG. 1, FIG. 1 shows a schematic view of a wireless communication system according to embodiments of the present disclosure. As shown in FIG. 1, the wireless communication system is a communication system based on a cellular mobile communication technology and may include several user equipment 110 and several base stations 120.

The user equipment 110 may be an equipment configured to provide voice and/or data connectivity to a user. The user equipment 110 may be in communication with one or more core networks via a radio access network (RAN). The user equipment 110 may be an Internet of Things user equipment, such as a sensor equipment, a mobile phone (or referred to as a "cellular" phone) and a computer with the Internet of Things user equipment. For example, the user equipment 110 may be a fixed, portable, pocket, handheld, computer built-in or on-board device. For example, the user equipment 110 may be a Station (STA), a subscriber unit, a subscriber station, a mobile station, a mobile, a remote station, an access point, a remote terminal, an access terminal, a user terminal, a user agent, a user device or a user apparatus. Or, the user equipment 110 may also be an equipment of an unmanned aerial vehicle. Or, the user equipment 110 may also be an on-board equipment, such as a trip computer with a wireless communication function, or a wireless user equipment connected to an external trip computer. Or, the user equipment 110 may also be a roadside equipment, such as a street lamp, a signal lamp or other roadside equipment with a wireless communication function.

The base station 120 may be a network-side equipment in the wireless communication system. The wireless communication system may be a 4th generation mobile communication (4G) system, also referred to as a Long Term Evolution (LTE) system. Or, the wireless communication system may also be a 5G system, also referred to as a new radio system or a 5G NR system. Or, the wireless communication system may also be a next generation system of the 5G system. An access network in the 5G system may be referred to as a New Generation-Radio Access Network (NG-RAN).

The base station 120 may be an evolved Node B (eNB) adopted in the 4G system. Or, the base station 120 may also be a base station (gNB) adopting a concentrated distribution architecture in the 5G system. When adopting the concentrated distribution architecture, the base station 120 usually includes a central unit (CU) and at least two distributed units (DU). The central unit includes a protocol stack of a Packet Data Convergence Protocol (PDCP) layer, a Radio Link Control (RLC) layer, and a Medium Access Control (MAC) layer. The distributed unit includes a protocol stack of a Physical (PHY) layer. The specific implementation manner of the base station 120 is not limited in the embodiments of the present disclosure.

A wireless connection may be established between the base station 120 and the user equipment 110 through a wireless radio. In different embodiments, the wireless radio is a wireless radio based on a standard of a 4th generation mobile communication network technology (4G). Or, the wireless radio is a wireless radio based on a standard of a 5th generation mobile communication network technology (5G), for example, the wireless radio is a new radio. Or, the wireless radio may also be a wireless radio based on a standard of a next generation mobile communication network technology of the 5G.

In some embodiments, an E2E (End to End) connection may also be established between the user equipment 110, such as scenes of a vehicle to vehicle (V2V) communication, a vehicle to infrastructure (V2I) communication and a vehicle to pedestrian (V2P) communication in a vehicle to everything (V2X) communication.

Here, the above user equipment may be considered as a terminal equipment of the following embodiments.

In some embodiments, the above wireless communication system may further include a network management device 130.

Several base stations 120 are connected to the network management device 130, respectively. The network management device 130 may be a core network device in the wireless communication system. For example, the network management device 130 may be a Mobility Management Entity (MME) in an Evolved Packet Core (EPC). Or, the network management device may also be other core network devices, such as a Service GateWay (SGW), a Public Data Network GateWay (PGW), a Policy and Charging Rules Function (PCRF) or a Home Subscriber Server (HSS). The implementation form of the network management device 130 is not limited in the embodiments of the present disclosure.

Figure 2:
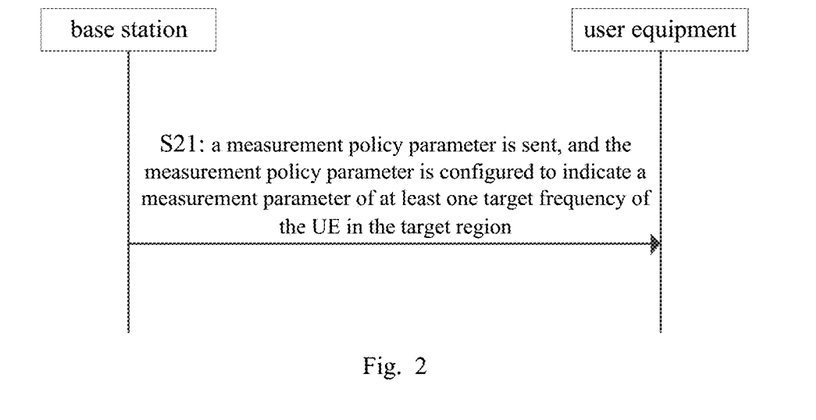
FIG. 2 is a flow chart of a cell measurement processing method according to an illustrative embodiment.

As shown in FIG. 2, the embodiment provides a processing method for cell measurement, which is applied to the base station. The method includes the following step.

At step S21, a measurement policy parameter is sent to a user equipment (UE). The measurement policy parameter is configured to indicate a measurement parameter of at least one target frequency of the UE in a target region.

The base station is an interface equipment for the user equipment to access the internet. The base station may be various types of base stations, such as a 3G base station, a 4G base station, a 5G base station or other evolved base stations.

The base station may be either a non-ground base station or a ground base station. In the embodiments of the present disclosure, the non-ground base station corresponds to a non-territorial network (NTN), and the ground base station corresponds to a territorial network (TN).

The user equipment (UE) may be a mobile phone, a computer, a server, a transceiver, a tablet device or a medical device, and so on.

The target region is a region where the UE is located. One cell includes one or more regions.

For example, in an application scene, a cell is divided into a plurality of regions. Each region has a region identifier that uniquely identifies the region. The target region is a region where the UE is located.

The target frequency is a frequency corresponding to the target region. One target region corresponds to at least one target frequency.

In some embodiments of the present disclosure, the target frequencies corresponding to different target regions include at least one same target frequency. In some other embodiments of the present disclosure, the target frequencies corresponding to different target regions are different from each other.

In an embodiment, one target region corresponds to at least one target base station.

The target base station is a base station of the territorial network (TN) type or a base station of the non-territorial network (NTN) type. A type of a network covered by the territorial network base station is the territorial network. A type of a network covered by the non-territorial network base station is the non-territorial network.

If one target region only corresponds to one network type, the target frequency is a frequency of a network type to which the target region corresponds. For example, if the target region only corresponds to the territorial network, the target frequency is a frequency of the territorial network.

If one target region corresponds to two or more network types, the target frequency includes one or more of the frequencies of all the network types in the target region. For example, if the target region includes the territorial network and the non-territorial network, the target frequency is at least one frequency corresponding to the territorial network and/or at least one frequency corresponding to the non-territorial network.

In some embodiments of the present disclosure, the UE queries at a region parameter according to the target region corresponding to a current location, so as to determine a frequency to be measured. The embodiments of the present disclosure are different from the related art, and do not select a frequency for measurement according to a base station indicator or a cell indicator or perform measurement according to a historical access frequency.

The measurement policy parameter includes but is not limited to at least one of the region parameter, a measurement parameter, the target frequency, a frequency deployment type parameter and a region measurement frequency type.

In the embodiments of the present disclosure, measuring the target frequency may be measuring a channel quality of the UE transmitting data by using the target frequency. For example, a signal to noise ratio or a signal intensity of the UE transmitting data at the target frequency is measured.

In the embodiments of the present disclosure, the base station sends the measurement policy parameter to the UE, such that the UE may know the target frequency to be measured in the region where the EU itself is located. Therefore, the UE may measure the target frequency of the target region where the UE is located based on the measurement policy parameter, i.e., the UE may directly perform measurement according to the target frequency of the target region configured by the base station, thus realizing a targeted measurement. Therefore, an accessible target frequency in the target region can be found as soon as possible. Moreover, the unnecessary power consumption and power loss of the UE caused by the untargeted frequency measurement is further reduced.

In some embodiments, the measurement policy parameter includes: the region parameter configured to identify a location parameter of the target region; and the measurement parameter configured to identify the at least one target frequency in the target region and a sequence parameter corresponding to the target frequency, the sequence parameter being configured to indicate a receiver to measure a frequency corresponding to the target frequency according to the sequence parameter.

In an embodiment, the region parameter includes parameters related to a length and a width of the target region. In the embodiments of the present disclosure, the target region may be uniquely determined based on a length parameter and a width parameter.

In another embodiment, the region parameter includes parameters of a coordinate of a center point and a radius of the target region. In the embodiments of the present disclosure, the target region may be uniquely determined based on the parameters of the coordinate of the center point and of the radius.

Of course, in other embodiments, the region parameter may also be a coordinate parameter or longitude and latitude parameters, etc. For example, the cell is mapped to a two-dimensional coordinate system, which includes an abscissa (X) and an ordinate (Y). Any region in the cell may be represented based on the parameter of the two-dimensional coordinate system (X, Y).

In the embodiments of the present disclosure, the base station sends the measurement policy parameter including the region parameter to the UE, such that the UE may know the region corresponding to the current location.

In an embodiment, the measurement parameter includes the target frequency.

In another embodiment, the measurement parameter includes at least two target frequencies and the sequence parameter corresponding to each target frequency. Here, based on the sequence parameter, the receiver may know the sequence of measuring the target frequencies.

The receiver here is the UE receiving the measurement policy parameter.

In the embodiments of the present disclosure, the base station sends the measurement policy parameter including the measurement parameter to the UE, such that the UE may know the target frequencies to be measured in the region where the UE is located; and/or the sequence of measurements of the target frequencies to be measured. Therefore, the target frequencies may be measured in a certain measurement sequence, thus improving the efficiency of the frequency measurement and facilitating the UE to switch to a more appropriate frequency for communication.

In an embodiment, the measurement parameter includes at least one target frequency of the target region, and a priority corresponding to the target frequency.

The sequence parameter here includes the priority.

For example, there are three target frequencies in target region 1, and the three target frequencies are frequency 1, frequency 2 and frequency 3, respectively. The priority corresponding to frequency 1 is priority 1, the priority corresponding to frequency 2 is priority 2, and the priority corresponding to frequency 3 is priority 3. The priorities have following priority sequences: the priority sequence of priority 1 is less than the priority sequence of priority 2, and the priority sequence of priority 2 is less than the priority sequence of priority 3. Therefore, by sending the three target frequencies and the priorities corresponding to the three target frequencies to the UE, the UE may know the sequence of measuring the three target frequencies.

Of course, in other embodiments, the sequence parameter may be any parameter that identifies the sequence in which a plurality of target frequencies are measured sequentially.

In some embodiments, the measurement policy parameter includes: the frequency deployment type parameter configured to identify a network type parameter corresponding to the target frequency, the network type parameter including the territorial network type or the non-territorial network type; and the region measurement frequency type configured to identify the frequency deployment type parameter to be measured in the target region.

In the embodiments of the present disclosure, the base station sends the measurement policy parameter including the frequency deployment type parameter and the region measurement frequency type to the UE, such that the UE may determine what network type of target frequency needs to be measured in the target region based on knowing what network type of frequency of the target region where the UE is located is. Therefore, the embodiments of the present disclosure may determine which network type needs to be measured through the region measurement frequency type parameter in the target region.

Moreover, in the embodiments of the present disclosure, the target frequencies of the territorial network covered by the territorial network base station and the non-territorial network covered by the non-territorial network base station may be determined. Thus, the UE may select the target frequency of the network type which is appropriate to itself for measurement. For example, only the target frequency of the territorial network may be selected for measurement.

In some embodiments, the measurement parameter includes the target frequency of the territorial network base station of the target region and the priority corresponding to the target frequency, and/or, the target frequency of the non-territorial network base station of the target region and the priority corresponding to the target frequency.

For example, target region 1 includes the territorial network covered by the territorial network base station and the non-territorial network covered by the non-territorial network base station. Each of the target frequency to be measured in the territorial network and the target frequency to be measured in the non-territorial network includes frequency 1, frequency 2 and frequency 3, so the measurement parameter includes frequency 1, frequency 2 and frequency 3 corresponding to the territorial network, and a priority of frequency 1 of the territorial network, a priority of frequency 2 of the territorial network, and a priority of frequency 3 of the territorial network; and/or, frequency 1, frequency 2 and frequency 3 corresponding to the non-territorial network, and a priority of frequency 1 of the non-territorial network, a priority of frequency 2 of the non-territorial network, and a priority of frequency 3 of the non-territorial network. In an embodiment of the present disclosure, the priorities of the above six target frequencies may be: frequency 1 of the non-territorial network, frequency 1 of the territorial network, frequency 3 of the non-territorial network, frequency 2 of the non-territorial network, frequency 2 of the territorial network, and frequency 3 of the territorial network. In other words, the priorities of the frequencies of the territorial network and the priorities of the frequencies of the non-territorial network may be intertwined. In another embodiment of the present disclosure, the priorities of the above six target frequencies may be: frequency 1 of the territorial network, frequency 2 of the territorial network, frequency 3 of the territorial network, frequency 1 of the non-territorial network, frequency 2 of the non-territorial network, and frequency 3 of the non-territorial network. In other words, the priorities of the frequencies of one network type (for example, the territorial network) are higher than the priorities of the frequencies of the other network type (for example, the non-territorial network). In the same type, each frequency also corresponds to its own priority.

Therefore, in the embodiments of the present disclosure, the UE may know the target frequencies to be measured in respective network types and the measurement sequence of the target frequencies of the respective network types.

In an embodiment, the same target frequency has different priorities in different target regions.

For example, the target frequency corresponding to target region 1 includes frequency 1, and the target frequency corresponding to target region 2 includes frequency 1. A priority of frequency 1 of the target frequency in target region 1 is higher than a priority of frequency 2 of the target frequency in target region 2.

Since the UE transmits data with different signal intensities based on the same frequency in respective target regions of the cell, different priorities may be configured for the same target frequency in different regions. In this way, the UE may preferentially select appropriate target frequencies for the respective target regions for measurement.

Of course, in other embodiments, the same target frequency may have the same priority in different target regions.

In an embodiment, the same frequency may have different priorities in different network types of the same target region. Here, the priority of the target frequency of the territorial network is higher than the priority of the target frequency of the non-territorial network.

For example, the network type corresponding to target region 1 includes the territorial network and the non-territorial network, and the target frequency corresponding to target region 1 includes frequency 1. The priority of frequency 1 of the territorial network corresponding to target region 1 is higher than the priority of frequency 1 of the territorial network corresponding to target region 1.

Since the distance between the non-territorial network base station and the ground is relatively large, the delay of data communication based on the territorial network base station is relatively large. In general, when the territorial network is used for this region, the territorial network base station of the territorial network is expected to be used for data communication as much as possible, so as to reduce the communication delay. In this way, the priority of the target frequency of the territorial network may be set to be higher than the priority of the target frequency of the non-territorial network. Therefore, after determining the target region where the UE is located, the UE may try to select the target frequency with a high priority for measurement. At this time, the network type corresponding to the target frequency with the high priority is the territorial network, which is conducive to reducing the delay when sending data based on the target frequency subsequently.

Of course, in other embodiments, the priority of the target frequency of the territorial network may also be lower than or equal to the priority of the target frequency of the non-territorial network.

Of course, in other embodiments, the same frequency may have the same priority in different network types of the same target region.

In some embodiments, the measurement policy parameter further includes a threshold parameter. The threshold parameter is configured to allow the UE to measure the frequency of the region having the same network type as the target region when a measurement result on the target frequency meets a threshold value; or, to allow the UE to measure the frequency having a higher priority than the target frequency when the measurement result on the target frequency does not meet the threshold value.

The measurement result on the target frequency meets the threshold value here means that the measurement result on the target frequency is less than the threshold value. The measurement result on the target frequency does not meet the threshold value means that the measurement result on the target frequency is greater than the threshold value.

In the embodiments of the present disclosure, when the measurement result of the target frequency meets the threshold value, the region having the same network type as the target region may be measured.

In some embodiments, step S21 includes sending the measurement policy parameter to the UE.

In some embodiments, at step S21, sending the measurement policy parameter includes: broadcasting the measurement policy parameter; or unicasting a message carrying the measuring policy parameter to the UE.

For example, in an application scene, a first information is broadcast, and the first information carries a broadcast policy parameter. Here, the UE receiving the broadcast measurement policy parameter of the base station may be a UE of Radio Resource Control (RRC) or a UE in a RRC connected state.

For another example, in another application scene, a dedicated signaling is unicast to the UE, and the dedicated signaling carries the measurement policy parameter. Here, the UE receiving the unicast dedicated signaling of the base station may be the UE in the RRC connected state. In this example, when the UE in the RRC connected state switches to a RRC idle state, the UE may continue to use the measurement policy parameter obtained through the dedicated signaling.

The dedicated signaling may reconfigure a message for the Radio Resource Control (RRC).

In the embodiments of the present disclosure, by broadcasting the measurement policy parameter, all the UE within the coverage of the base station may receive the measurement policy parameter, thus saving the cost of broadcasting information.

Or, by sending the measurement policy parameter to the corresponding UE through the dedicated signaling, the measurement policy parameter may be configured separately for each UE, so as to meet the needs of different UE. Moreover, by sending the measurement policy parameter through the dedicated signaling, the stability of the data communication between the base station and the UE can be improved.

It should be pointed out here that, a following processing method for cell measurement is applied to the UE, and a description of the method is similar to the description of the above processing method for cell measurement applied to the base station. For the technical details not disclosed in the embodiments of the processing method for cell measurement applied to the UE in the present disclosure, please refer to the description of the embodiments of the processing method for cell measurement applied to the base station in the present disclosure, which will not be described in detail here.

Figure 3:
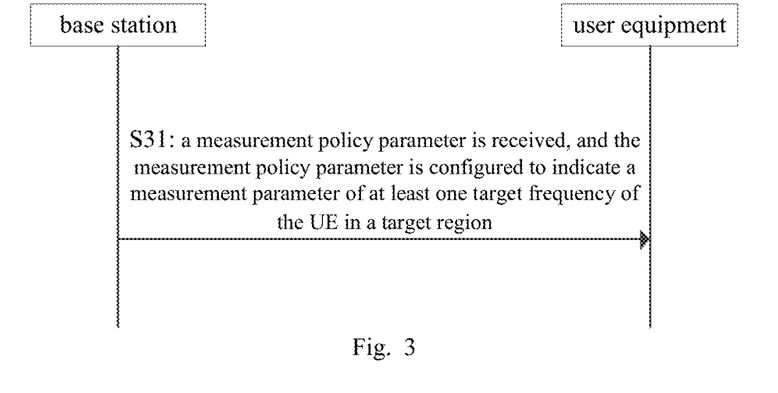
FIG. 3 is a flow chart of a cell measurement processing method according to an illustrative embodiment.

As shown in FIG. 3, embodiments of the present disclosure further provide a processing method for cell measurement, which is applied to the UE. The method includes the following step.

At step S31, a measurement policy parameter is received. The measurement policy parameter is configured to indicate a measurement parameter of at least one target frequency of the UE in a target region.

In an embodiment, the method further includes the following step. Based on the measurement policy parameter, the measurement of at least one target frequency of the target region where the UE is located is determined.

In some embodiments, the measurement policy parameter includes: a region parameter configured to identify a location parameter of the target region; and a measurement parameter configured to identify the at least one target frequency in the target region and a sequence parameter corresponding to the target frequency, the sequence parameter being configured to indicate the receiver to measure the frequency corresponding to the target frequency according to the sequence parameter.

In some embodiments, the measurement policy parameter includes: a frequency deployment type parameter configured to identify a network type parameter corresponding to the target frequency, the network type parameter including a territorial network type or a non-territorial network type, i.e. the network type parameter being configured to indicate a network to be a territorial network or a non-territorial network; and a region measurement frequency type configured to identify the frequency deployment type parameter to be measured in the target region.

In some embodiments, the region parameter includes parameters related to a length and a width of the target region, or the region parameter includes parameters of a coordinate of a center point and a radius of the target region.

In some embodiments, the measurement parameter includes at least one target frequency of the target region, and a priority corresponding to the target frequency.

In some embodiments, the measurement parameter includes a target frequency of the territorial network base station of the target region and a priority corresponding to the target frequency, and/or, a target frequency of the non-territorial network base station of the target region and a priority corresponding to the target frequency.

In some embodiments, receiving the measurement policy parameter includes: receiving the measurement policy parameter through broadcasting; or, receiving a message carrying the measurement policy parameter through unicasting.

Figure 4:
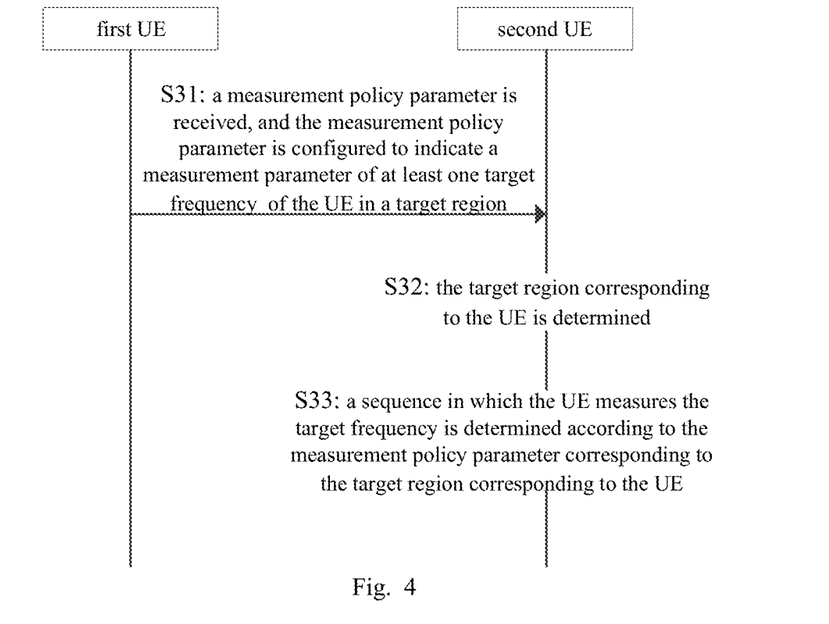
FIG. 4 is a flow chart of a cell measurement processing method according to an illustrative embodiment.

As shown in FIG. 4, in some embodiments, the method further includes following steps.

At step S32, the target region corresponding to the UE is determined.

At step S33, a sequence in which the UE measures the target frequency is determined according to the measurement policy parameter corresponding to the target region corresponding to the UE.

In an embodiment, step S32 includes determining the target region corresponding to the UE according to the region parameter carried in the measurement policy parameter.

In the example, the target region may be determined according to the parameters related to the length and the width in the region parameter and a length parameter and a width where the UE is currently located. Or, the target region may be determined according the parameters of the coordinate of the center point and the radius in the region parameter and a coordinate of a center point and a radius where the UE is currently located.

In an embodiment, step S33 includes determining the sequence in which the UE measures the target frequency according to the sequence parameter in the measurement policy parameter corresponding to the target region corresponding to the UE.

In another embodiment, the method further includes determining the target frequency of the network type in which the target region to be measured is located based on the region measurement frequency type in the measurement policy parameter.

Therefore, in the embodiments of the present disclosure, the UE may determine at least one of the target region where the UE is located, the target frequency of the target region to be measured, the target frequency of what network type of the target region to be measured, and the measurement sequence of measuring a plurality of target frequencies based on the measurement policy parameter. Therefore, the embodiments of the present disclosure enable the UE to accurately and efficiently determine the target frequency to be measured, thus reducing the unnecessary power consumption and power loss of the UE caused by the untargeted frequency measurement.

A specific example is provided below in combination with any of the above embodiments.

Figure 5:
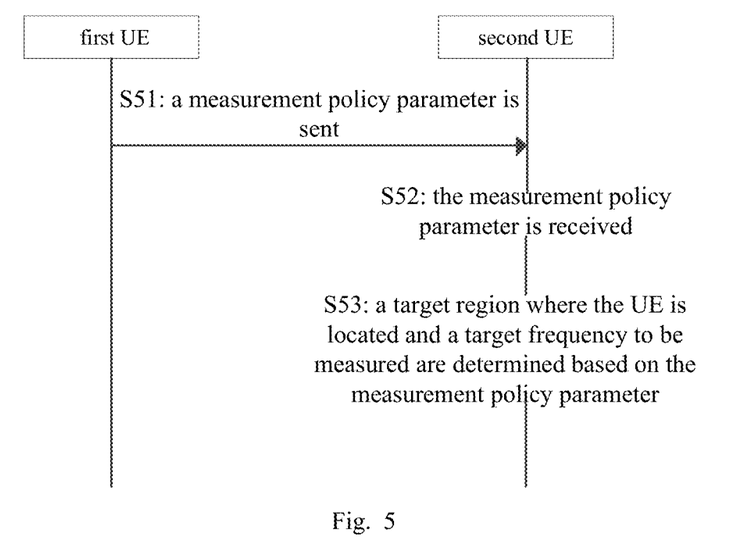
FIG. 5 is a flow chart of a cell measurement processing method according to an illustrative embodiment.

As shown in FIG. 5, embodiments of the present disclosure further provide a processing method for cell measurement, which is applied to a cell measurement processing system. The cell measurement processing system includes a base station and a UE. The method includes the following steps.

At step S51, a measurement policy parameter is sent to the UE.

In an embodiment, the base station broadcasts the measurement policy parameter. The measurement policy parameter includes one or more of the following: a region parameter; at least one target frequency; a priority corresponding to the target frequency; a network type parameter corresponding to the target frequency; and a region measurement frequency type configured to indicate the network type parameter corresponding to the target frequency to be measured in the target region.

In this example, the region parameter includes a length parameter, a width parameter and region identifiers corresponding to the length parameter and the width parameter. For example, a region identifier corresponding to a length of 0-50 km and a width of 0-50 km in the cell is region 3. Here, the region identifier is configured to uniquely identify a region in the cell.

In this example, the target frequency includes frequency 1, frequency 2, frequency 3 and frequency 4. The priority corresponding to frequency 1 is priority 3, and the network type parameter corresponding to frequency 1 is the territorial network type. The priority corresponding to frequency 2 is priority 2, and the network type parameter corresponding to frequency 2 is the non-territorial network type. The priority corresponding to frequency 3 is priority 3, and the network type parameter corresponding to frequency 3 is the territorial network type. The priority corresponding to frequency 4 is priority 4, and the network type parameter corresponding to frequency 4 is the non-territorial network type.

In this example, the region measurement frequency type is configured to indicate to measure the target frequency of the territorial network type in target region 3, and to indicate to measure the target frequency of the non-territorial network type in target region 1, target region 2, and target region 4.

At step S52, the measurement policy parameter is received.

In an embodiment, the UE receives the broadcast measurement policy parameter.

The UE here transmits data on frequency 2, and the cell where the UE resides at this time is the non-territorial network cell.

At step S53, the target region where the UE is located and the target frequency to be measured are determined based on the measurement policy parameter.

In an embodiment, the UE determines the target region where the UE is located based on the region parameter in the measurement policy parameter and the geographic information of a location where the UE is currently located, and determines the target frequency to be measured by the UE based on the priority corresponding to the target frequency and the network type parameter corresponding to the target frequency in the measurement policy parameter.

In step S53 of this example, at a first step, the UE determines that the target region where the UE is located is region 3 based on the region parameter in the measurement policy parameter and the geographic information of the location where the UE is currently located. At a second step, the UE determines the target frequency of the territorial network type to be measured by the UE based on the region measurement frequency type in the measurement policy parameter. The target frequency of the territorial network type includes frequency 1 and frequency 3. At a third step, the UE determines that a frequency having a higher priority than frequency 2 needs to be measured in response to that the UE measures that the measurement result of frequency 2 where the UE is currently located is greater than the threshold value. The frequency having the priority higher than priority 2 of frequency 2 is frequency 1, and the priority of frequency 1 is priority 3. Thus, it is determined that the frequency that needs to be measured is frequency 1.

In the above third step, the UE determines that a frequency having a lower priority than frequency 2 may be additionally measured in response to that the UE measures that the measurement result of frequency 2 where the UE is currently located is less than the threshold value. At this time, the UE may measure all frequencies of the network type corresponding to the target region, i.e., the UE may measure frequency 1 and frequency 3 of the territorial network type.

In this example, the threshold value may be pre-stored in the UE. The threshold value may also be carried in the measurement policy parameter. At this time, in the above step S51, the measurement policy parameter further carries the threshold value. Therefore, the UE may obtain the threshold value based on the measurement policy parameter broadcast by the base station.

In the embodiments of the present disclosure, the UE is configured with the measurement policy parameter through the base station, such that the UE may know the frequency to be measured in the region where the UE is located. Therefore, the UE may accurately measure the target frequency in the target region where the UE is located based on the measurement policy parameter, thus reducing the unnecessary power consumption and power loss of the UE caused by the untargeted frequency measurement.

Moreover, the UE in the embodiments of the present disclosure may choose whether to measure the target frequency of the network type corresponding to the target region based on the priority of the target frequency in the measurement policy parameter. Therefore, only the target frequency that meets the requirement may be selected for measurement, thus further reducing the power consumption and power loss, and improving the measurement efficiency.

In the above embodiment, the priority corresponding to the target frequency is universal for respective target regions in the cell. However, in some other embodiments, the priority corresponding to the same target frequency may be different for different regions. Therefore, the UE may select the target frequency of the corresponding region for measurement based on the priority of the target frequency.

Figure 6:
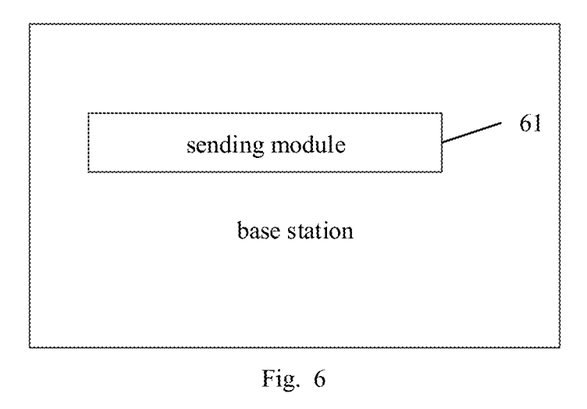
FIG. 6 is a block diagram of a cell measurement processing device according to an illustrative embodiment.

As shown in FIG. 6, embodiments of the present disclosure further provide a cell measurement processing device, which is applied to the base station. The device includes: a sending module 61 configured to send the measurement policy parameter. The measurement policy parameter is configured to indicate a measurement parameter of at least one target frequency of the UE in a target region.

In some embodiments, the measurement policy parameter include: a region parameter configured to identify a location parameter of the target region; and a measurement parameter configured to identify the at least one target frequency in the target region and a sequence parameter corresponding to the target frequency, the sequence parameter being configured to indicate the receiver to measure the frequency corresponding to the target frequency according to the sequence parameter.

In some embodiments, the measurement policy parameter includes: a frequency deployment type parameter configured to identify a network type parameter corresponding to the target frequency, the network type parameter including a territorial network type or a non-territorial network type; and a region measurement frequency type configured to identify the frequency deployment type parameter to be measured in the target region.

In some embodiments, the region parameter includes parameters related to a length and a width of the target region, or the region parameter includes parameters of a coordinate of a center point and a radius of the target region.

In some embodiments, the measurement parameter includes at least one target frequency of the target region, and a priority corresponding to the target frequency.

In some embodiments, the measurement parameter includes a target frequency of a territorial network base station of the target region and a priority corresponding to the target frequency, and/or, a target frequency of a non-territorial network base station of the target region and a priority corresponding to the target frequency.

In some embodiments, the sending module 61 is configured to broadcast the measurement policy parameter, or, to unicast a message carrying the measuring policy parameter to the UE.

Figure 7:
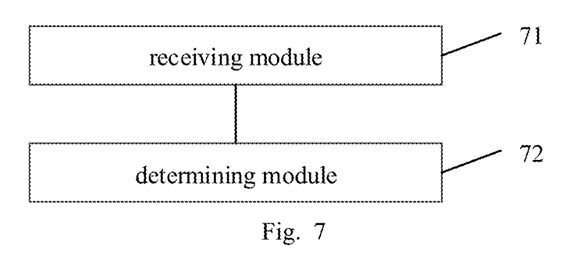
FIG. 7 is a block diagram of a cell measurement processing device according to an illustrative embodiment.

As shown in FIG. 7, embodiments of the present disclosure further provide a cell measurement processing device, which is applied to the UE. The device includes: a receiving module 71 configured to receive a measurement policy parameter. The measurement policy parameter is configured to indicate a measurement parameter of at least one target frequency of the UE in a target region.

In some embodiments, the measurement policy parameter includes: a region parameter configured to identify a location parameter of the target region; and a measurement parameter configured to identify the at least one target frequency in the target region and a sequence parameter corresponding to the target frequency, the sequence parameter being configured to indicate the receiver to measure the frequency corresponding to the target frequency according to the sequence parameter.

In some embodiments, the measurement policy parameter includes: a frequency deployment type parameter configured to identify a network type parameter corresponding to the target frequency, the network type parameter including a territorial network type or a non-territorial network type; and a region measurement frequency type configured to identify the frequency deployment type parameter to be measured in the target region.

In some embodiments, the region parameter includes parameters related to a length and a width of the target region, or the region parameter includes parameters of a coordinate of a center point and a radius of the target region.

In some embodiments, the measurement parameter includes at least one target frequency of the target region, and a priority corresponding to the target frequency.

In some embodiments, the measurement parameter includes a target frequency of a territorial network base station of the target region and a priority corresponding to the target frequency, and/or, a target frequency of a non-territorial network base station of the target region and a priority corresponding to the target frequency.

In some embodiments, the receiving module 71 is configured to receive the measurement policy parameter through broadcasting, or, to receive a message carrying the measurement policy parameter through unicasting.

In some embodiments, the device further includes a determining module 72 configured to determine the target region corresponding to the UE, and to determine a sequence in which the UE measures the target frequency according to the measurement policy parameter corresponding to the target region corresponding to the UE.

As for the devices in the above embodiments, the specific manners of respective modules performing operations have been described in detail in the embodiments related to the methods, and will not be described in detail here.

Embodiments of the present disclosure provide a user equipment. The user equipment includes: a processor; and a memory configured to store an instruction executable by the processor. The processor is configured to implement the processing method for cell measurement described in any of the embodiments of the present disclosure when running the executable instruction.

The user equipment here includes a base station or a user equipment.

The processor may include various types of storage media, and the storage medium is a non-temporary computer storage medium, and may continue to store information stored on it after the user equipment is powered off.

The processor may be connected to the memory via a bus or the like, so as to read an executable program stored on the memory, for example, at least one of the methods shown in FIGS. 2 to 5.

Embodiments of the present disclosure further provide a computer storage medium, and the computer storage medium stores a computer executable program. The processing method for cell measurement described in any of the embodiments of the present disclosure, for example, at least one of the methods shown in FIGS. 2 to 5, is implemented when the executable program is executed by the processor.

As for the devices in the above embodiments, the specific manner of respective modules performing operations have been described in detail in the embodiments related to the methods, and will not be described in detail here.

Figure 8:
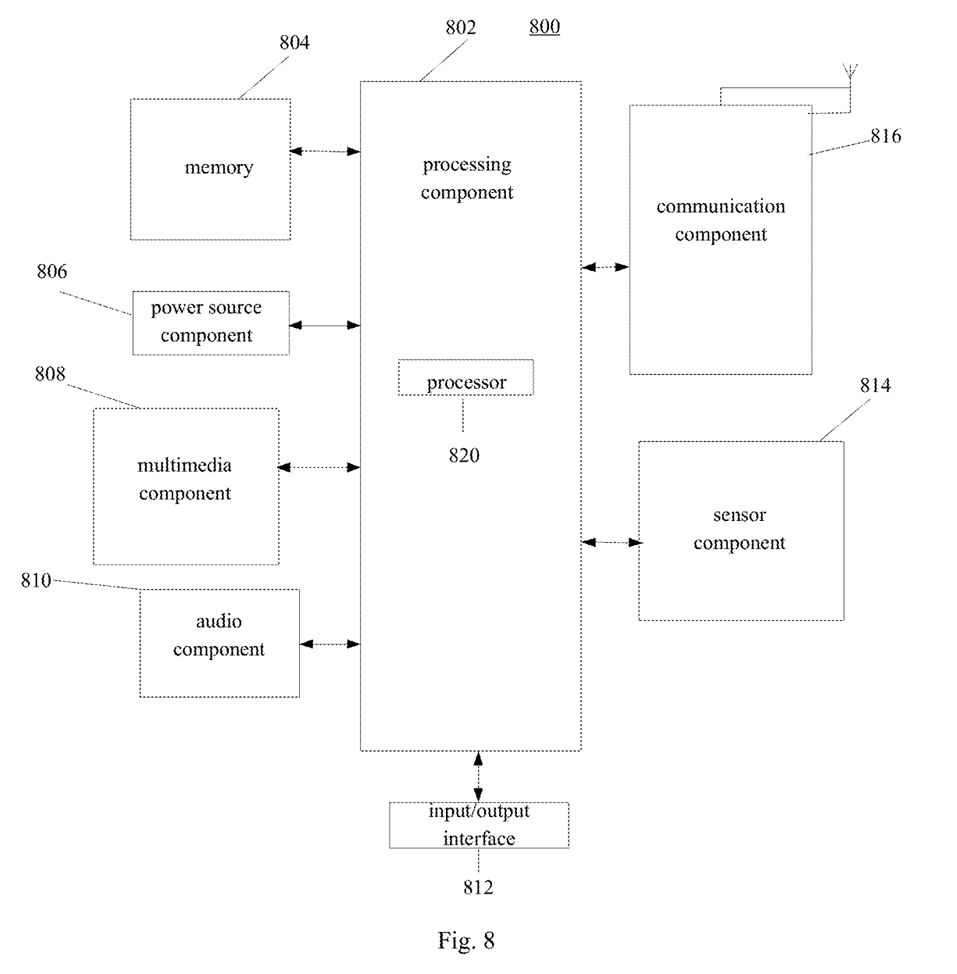
FIG. 8 is a block diagram of a user equipment according to an illustrative embodiment.

FIG. 8 is a block diagram of a user equipment 800 according to an illustrative embodiment. For example, the user equipment 800 may be a mobile phone, a computer, a digital broadcast device, a messaging device, a game console, a tablet device, a medical device, a fitness device, a personal digital assistant, and the like.

As illustrated in FIG. 8, the user equipment 800 may include one or more components of the followings: a processor component 802, a memory 804, a power source component 806, a multimedia component 808, an audio component 810, an input/output (I/O) interface 812, a sensor component 814 and a communication component 816.

The processing component 802 usually controls an overall operation of the user equipment 800, such as operations associated with display, telephone calls, data communications, camera operations, and recording operations. The processing component 802 may include one or more processors 820 to execute instructions, to complete all or part of the steps in the above methods. In addition, the processing component 802 may include one or more modules which facilitate interaction between the processing component 802 and other components. For example, the processing component 802 may include a multimedia module to facilitate interaction between the multimedia component 808 and the processing component 802.

The memory 804 is configured to store various types of data to support operations at the user equipment 800. Examples of such data include instructions for any application programs or methods operated on the user equipment 800, contact data, phonebook data, messages, pictures, videos, etc. The memory 804 may be implemented using any type of volatile or non-volatile storage devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power source component 806 provides power to various components of the user equipment 800. The power source component 806 may include a power management system, one or more power sources, and other components related to generation, management, and distribution of power in the user equipment 800.

The multimedia component 808 includes a screen that provides an output interface between the user equipment 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 808 includes a front camera and/or a rear camera. When the user equipment 800 is in an operation mode, such as a photographing mode or a video mode, the front camera and/or the rear camera may receive external multimedia data. Each of the front and rear cameras may be a fixed optical lens system or have a focus and optical zoom capability.

The audio component 810 is configured to output and/or input audio signals. For example, the audio component 810 includes a microphone (MIC) configured to receive an external audio signal when the user equipment 800 is in an operating mode, such as a call mode, a recording mode, and a speech recognition mode. The received audio signal may be further stored in the memory 804 or transmitted via the communication component 816. In some embodiments, the audio component 810 further includes a loudspeaker, which is configured to output the audio signals.

The I/O interface 812 provides an interface between the processing component 802 and a peripheral interface module, such as a keyboard, a click wheel, a button and the like. The buttons may include, but are not limited to, a home button, a volume button, a starting button, and a locking button.

The sensor component 814 includes one or more sensors for providing status assessments of various aspects of the user equipment 800. For example, the sensor component 814 may detect an on/off state of the user equipment 800, a relative positioning of the components, such as the display and the keypad of the user equipment 800, a change in position of the user equipment 800 or of a component of the user equipment 800, a presence or an absence of the user's contact with the user equipment 800, an orientation or an acceleration/deceleration of the user equipment 800, and a change in temperature of the user equipment 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the user equipment 800 and other devices. The user equipment 800 can access a wireless network based on a communication standard, such as Wi-Fi, 2G, or 3G, or a combination of them. In an illustrative embodiment, the communication component 816 receives a broadcast signal or broadcast related information from an external broadcast management system via a broadcast channel. In an illustrative embodiment, the communication component 816 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the user equipment 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods described above.

In an illustrative embodiment, there is also provided a non-transitory computer readable storage medium including instructions, such as the memory 804 including instructions. The instructions can be executed by the processor 820 of the user equipment 800 to perform the methods described above. For example, the non-transitory computer readable storage medium may be a ROM, a random access memory (RAM), a CD-ROM, a magnetic tape, a floppy disk, an optical data storage device, and the like.

Figure 9:
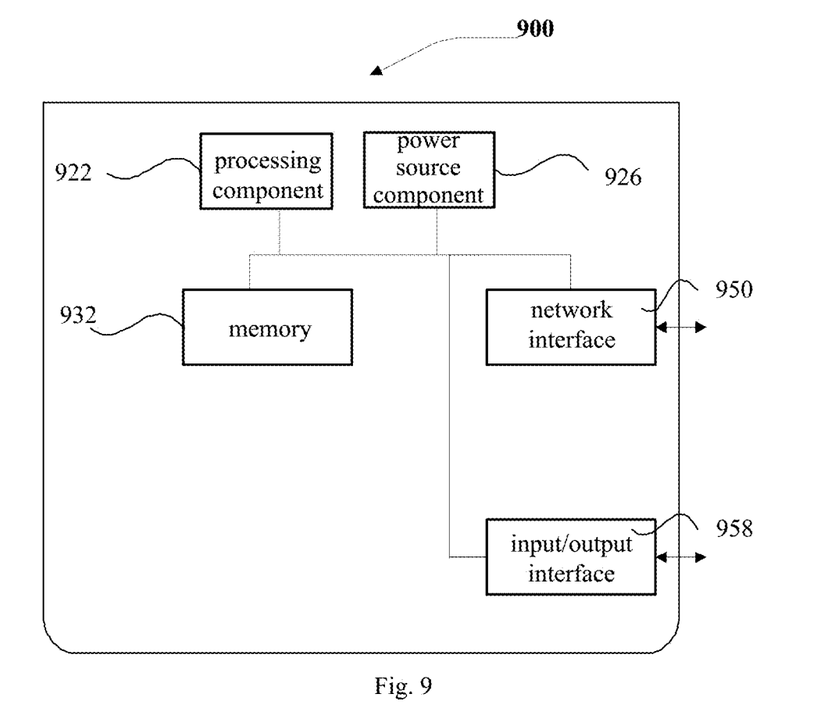
FIG. 9 is a block diagram of a base station according to an illustrative embodiment.

As shown in FIG. 9, an embodiment of the present disclosure shows a structure of a base station. For example, the base station 900 may be provided as a network side device. Referring to FIG. 9, the base station 900 includes a processing component 922, and the processing component 922 further includes one or more processors, and a memory resource represented by a memory 932, configured to store an instruction, such as an application program, that may be executed by the processing component 922. The application program stored in the memory 932 may include one or more modules each corresponding to a set of instructions. In addition, the processing component 922 is configured to execute the instruction, so as to perform any of the above methods applied to the base station as described above, for example, the methods shown in FIGS. 2 to 5.

The base station 900 may further include a power source component 926 configured to perform the power management of the base station 900, a wired or wireless network interface 950 configured to connect the base station 900 to the network, and an input/output (I/O) interface 958. The base station 900 may operate an operating system stored in the memory 932, such as a Windows Server™, a Mac OS X™, a Unix™, a Linux™, a FreeBSD™ or the like.

Other implementations of the present disclosure will be apparent to those skilled in the art from consideration of the specification and practice of the present disclosure. The present disclosure is intended to cover any change, use or adaptation of the present disclosure, which complies with the general principles of the present disclosure and includes the common knowledge or conventional technical means in the art that are not disclosed herein. The specification and embodiments are considered to be merely illustrative, and the true scope and spirit of the present disclosure are indicated by the following claims.

It should be understood that the present disclosure is not limited to the specific structures described above and shown in the accompanying drawings, and various modifications and changes may be made without departing from the scope of the present disclosure. The scope of the present disclosure is limited only by the appended claims.

The invention claimed is:

1. A cell measurement processing method, applied to a base station, comprising:
sending a measurement policy parameter to a user equipment (UE), the measurement policy parameter being configured to indicate a measurement parameter of a target frequency of the UE in a target region, and the measurement parameter indicating whether the UE measures a frequency of a network type corresponding to the target region;
wherein the measurement policy parameter comprises:
a frequency deployment type parameter configured to identify a network type parameter corresponding to the target frequency, the network type parameter being configured to indicate a network to be a territorial network or a non-territorial network,
wherein the measurement parameter comprises a plurality of the target frequencies of the target region and priorities corresponding to the plurality of the target frequencies.

2. The method according to claim 1, wherein the measurement policy parameter comprises:
a region parameter configured to identify a location of the target region; and
the measurement parameter configured to identify the target frequency in the target region and a sequence parameter corresponding to the target frequency, the sequence parameter being configured to indicate a receiver to measure a frequency corresponding to the target frequency according to the sequence parameter.

3. The method according to claim 2, wherein the region parameter comprises at least one of:
parameters related to a length and a width of the target region,
or
parameters of a coordinate of a center point and a radius of the target region.

4. The method according to claim 2, wherein the measurement parameter comprises at least one of following parameters:
a target frequency of a territorial network base station of the target region and a priority corresponding to the target frequency, or
a target frequency of a non-territorial network base station of the target region and a priority corresponding to the target frequency.

5. The method according to claim 1, wherein the measurement policy parameter comprises:
a region measurement frequency type configured to identify the frequency deployment type parameter to be measured in the target region.

6. The method according to claim 1, wherein sending the measurement policy parameter comprises at least one of:
broadcasting the measurement policy parameter; or
unicasting a message carrying the measurement policy parameter to the UE.

7. A cell measurement processing method, applied to a user equipment (UE), comprising:
receiving a measurement policy parameter, the measurement policy parameter being configured to indicate a measurement parameter of a target frequency of the UE in a target region, and the measurement parameter indicating whether the UE measures a frequency of a network type corresponding to the target region;
wherein the measurement policy parameter comprises:
a frequency deployment type parameter configured to identify a network type parameter corresponding to the target frequency, the network type parameter being configured to indicate a network to be a territorial network or a non-territorial network,
wherein the measurement parameter comprises a plurality of the target frequencies of the target region and priorities corresponding to the plurality of the target frequencies.

8. The method according to claim 7, wherein the measurement policy parameter comprises:
a region parameter configured to identify a location of the target region; and
the measurement parameter configured to identify the target frequency in the target region and a sequence parameter corresponding to the target frequency, the sequence parameter being configured to indicate a receiver to measure a frequency corresponding to the target frequency according to the sequence parameter.

9. The method according to claim 8, wherein the region parameter comprises at least one of:
parameters related to a length and a width of the target region,
or
parameters of a coordinate of a center point and a radius of the target region.

10. The method according to claim 8, wherein the measurement parameter comprises at least one of following parameters:
a target frequency of a territorial network base station of the target region and a priority corresponding to the target frequency, or
a target frequency of a non-territorial network base station of the target region and a priority corresponding to the target frequency.

11. The method according to claim 7, wherein the measurement policy parameter comprises:
a region measurement frequency type configured to identify the frequency deployment type parameter to be measured in the target region.

12. The method according to claim 7, wherein receiving the measurement policy parameter comprises at least one of:
receiving the measurement policy parameter through broadcasting; or
receiving a message carrying the measurement policy parameter through unicasting.

13. The method according to claim 7, further comprising:
determining the target region corresponding to the UE; and
determining a sequence in which the UE measures the target frequency according to the measurement policy parameter corresponding to the target region corresponding to the UE.

14. A cell measurement processing device, applied to a base station, comprising:
a processor; and
a memory configured to store an instruction executable by the processor,
wherein the processor is configured to implement following steps:
sending a measurement policy parameter to a user equipment (UE), the measurement policy parameter being configured to indicate a measurement parameter of a target frequency of the UE in a target region, and the measurement parameter indicating whether the UE measures a frequency of a network type corresponding to the target region;

wherein the measurement policy parameter comprises:
a frequency deployment type parameter configured to identify a network type parameter corresponding to the target frequency, the network type parameter being configured to indicate a network to be a territorial network or a non-territorial network,
wherein the measurement parameter comprises a plurality of the target frequencies of the target region and priorities corresponding to the plurality of the target frequencies.

15. The device according to claim 14, wherein the measurement policy parameter comprises:
a region parameter configured to identify a location of the target region; and
the measurement parameter configured to identify the target frequency in the target region and a sequence parameter corresponding to the target frequency, the sequence parameter being configured to indicate a receiver to measure a frequency corresponding to the target frequency according to the sequence parameter.

16. The device according to claim 15, wherein the region parameter comprises at least one of following parameters:
parameters related to a length and a width of the target region,
or
parameters of a coordinate of a center point and a radius of the target region.

17. The device according to claim 14, wherein the measurement policy parameter comprises:
a region measurement frequency type configured to identify the frequency deployment type parameter to be measured in the target region.

* * * * *